United States Patent
Burr et al.

(10) Patent No.: US 8,796,637 B1
(45) Date of Patent: Aug. 5, 2014

(54) TIMING CALIBRATION FOR TIME-OF-FLIGHT (TOF) PET USING POSITRON-EMITTING ISOTOPES AND ANNIHILATION TARGETS

(71) Applicants: Kabushiki Kaisha Toshiba, Minato-ku (JP); Toshiba Medical Systems Corporation, Otawara (JP)

(72) Inventors: Kent C. Burr, Buffalo Grove, IL (US); Xiaoli Li, Buffalo Grove, IL (US); Gin-Chung Wang, Grayslake, IL (US); Huini Du, Vernon Hills, IL (US); Daniel Gagnon, Twinsburg, OH (US)

(73) Assignees: Kabushiki Kaisha Toshiba, Minato-ku (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/902,554

(22) Filed: May 24, 2013

(51) Int. Cl.
*G01J 1/42* (2006.01)
*G01T 1/29* (2006.01)

(52) U.S. Cl.
CPC .................................. *G01T 1/2985* (2013.01)
USPC ....................................................... 250/393

(58) Field of Classification Search
CPC ..................................................... G01T 1/2985
USPC ......................... 250/393, 362, 363.01–363.1
See application file for complete search history.

(56) References Cited

U.S. PATENT DOCUMENTS

| | | | |
|---|---|---|---|
| 4,639,599 A * | 1/1987 | Ichihara | 250/363.04 |
| 7,414,246 B2 * | 8/2008 | Griesmer et al. | 250/363.09 |
| 7,820,975 B2 * | 10/2010 | Laurence et al. | 250/363.09 |
| 2007/0152162 A1 * | 7/2007 | Griesmer et al. | 250/363.09 |

FOREIGN PATENT DOCUMENTS

JP 2009-281816 12/2009

\* cited by examiner

*Primary Examiner* — Kiho Kim
(74) *Attorney, Agent, or Firm* — Oblon, Spivak, McClelland, Maier & Neustadt, L.L.P.

(57) ABSTRACT

A method and system for calibrating an imaging system in which a positron-emitting radioisotope source is arranged in or adjacent to an imaging region of the imaging system, an annihilation target is arranged at a position separated from the positron-emitting radioisotope source by a predetermined distance, coincident event pairs resulting from annihilation of positrons at the annihilation target are detected, a calibration time offset for a detector element in the imaging system is calculated based on the detected coincident event pairs, and the detector element is calibrated with the completed calibration time offset.

48 Claims, 15 Drawing Sheets

TIMING CALIBRATION FOR TIME-OF-FLIGHT (TOF) PET USING POSITRON-EMITTING ISOTOPES AND ANNIHILATION TARGETS

FIELD

The present disclosure generally relates to an apparatus and method for performing timing calibration for time-of-flight Positron Emission Tomography (PET) using positron-emitting isotopes and annihilation targets.

BACKGROUND

The quality of PET images has improved with the use of time-of-flight (TOF) Positron Emission Tomography (PET) technology. However, accurate timing calibration of the detectors is critical for TOF PET systems. An accurate, robust, and not very time-consuming crystal-based timing calibration method is needed to achieve the best timing information for TOF PET.

Existing timing calibration methods include (1) introducing light pulses into the photomultiplier tubes (PMTs) or introducing electrical pulses into the preamplifiers, (2) using a radioactive source embedded in a plastic scintillator coupled to a PMT, (3) using a rotating radioactive line source, and (4) using a radioactive point source in a scattering phantom.

As shown in FIG. 1, conventional timing calibration is performed using coincident 511 keV gamma rays 5 emitted following annihilation of positrons 3 and electrons 4. As shown in FIG. 1, the positron 3 is ejected from the radioisotope 2 with a significant kinetic energy (typically ~MeV), and travels some distance before annihilation. In the conventional art, generally, the source 1 and material around the source are arranged so that the annihilation occurs in the radioisotope or in the surrounding material, which is typically within a few mm of the positron-emitting isotope 2.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION

Figure 1:
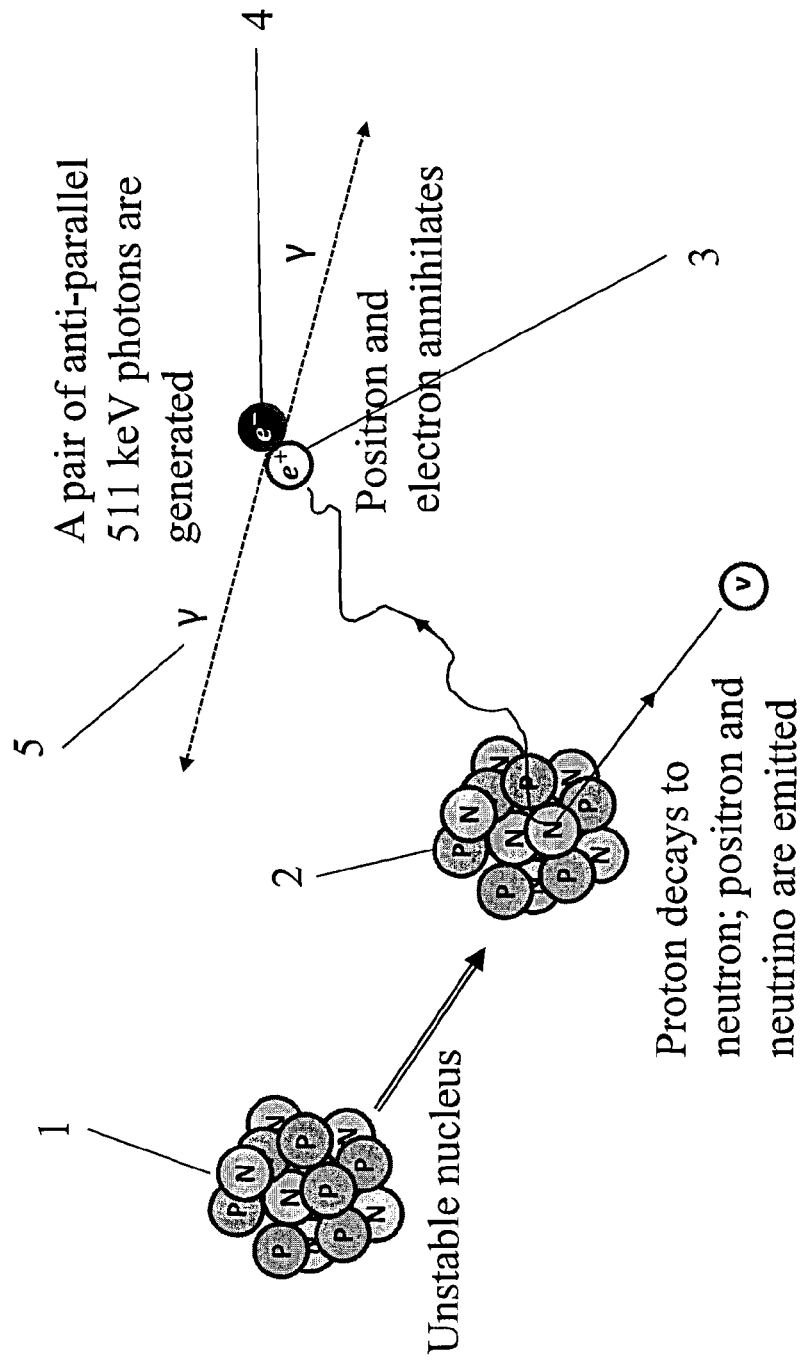
FIG. 1 shows an example of a positron being ejected from a radioisotope.

The present disclosure describes an apparatus and method for calibrating an imaging system.

Embodiments disclosed herein provide for a method of calibrating an imaging system. The method includes the steps of arranging a positron-emitting radioisotope source in or adjacent to an imaging region of the imaging system, arranging an annihilation target at a position separated from the positron-emitting radioisotope source by a predetermined distance, detecting coincident event pairs resulting from annihilation of positrons at the annihilation target, computing a calibration time offset for a detector element in the imaging system based on the detected coincident event pairs, and calibrating the detector element with the completed calibration time offset.

According to another embodiment of method, there is further included in the method the step of generating at least one pair-timing-difference histogram from the detected coincident event pairs.

According to another embodiment of method, the computing step further comprises computing the calibration time offset for the detector element using the at least one pair-timing-difference histogram.

According to another embodiment of method, the calibration time offset corresponds to the centroid of the pair-timing-difference histogram.

According to another embodiment of method, the step of computing the calibration time offset further includes applying a difference minimization technique.

According to another embodiment of method, the method further includes the step of iteratively updating the calibration time offset for each detector element until the absolute value of the centroid of the pair-timing-difference histogram for each detector element is below a preset threshold.

According to another embodiment of method, the positron-emitting radioisotope source is one of a point source and a line source.

According to another embodiment of method, the positron-emitting radioisotope source is outside of the field of view of the imaging system.

According to another embodiment of method, the annihilation target is an inner bore cover of the imaging system or is a surface of detectors in the imaging system.

According to another embodiment of method, the method further includes the step of suspending the annihilation target within the field of view of the scanner.

According to another embodiment of method, the annihilation target is in the shape of a cylindrical shell.

According to another embodiment of method, the method further includes the step of arranging the positron-emitting radioisotope source within the cylindrical shell.

According to another embodiment of method, the method further includes the step of partially evacuating the region between the positron-emitting radioisotope source and the annihilation target. This step has the effect of increasing positron range and, thereby, increasing the number of annihilation events in the annihilation target.

According to another embodiment of method, the method further includes the step of arranging the annihilation target at least 5 centimeters from the positron-emitting radioisotope source.

According to another embodiment of method, the method further includes the step of dividing the pair-timing-difference histogram for each line-of-response into at least one region, with each region representing one intersection of the line-of-response with the annihilation target.

According to another embodiment of method, the method further includes the step of applying a different time shift to each region, the time shift being calculated based on distances from intersection points to each detector element representing end points of the line-of-response. This step provides a correction for the actual position of annihilation.

According to another embodiment of method, the method further includes the step of depositing the positron-emitting radioisotope source substantially uniformly over the inner surface of the cylindrical shell.

According to another embodiment of method, the method further includes the step of encapsulating the positron-emitting radioisotope source in a resin.

According to another embodiment of method, the method further includes the step of applying the positron-emitting radioisotope source to the inner surface in liquid form.

According to another embodiment of method, the method further includes at least one of the steps of mixing the liquid positron-emitting radioisotope source with gelatin, mixing an adhesive type material with the liquid positron-emitting radioisotope source, and making the inner surface from an absorbent material.

According to another embodiment of method, the method further includes the step of arranging a field-of-view for forming coincident pairs such that when multiple intersections of any lines-of-response with the annihilation target exist, distances between subsequent intersections are extensive enough to allow for distinct regions to be identified from inspection of the pair-timing-difference histogram. There will be one separate "bump" in the histogram for each intersection with the annihilation target.

According to another embodiment of method, the positron-emitting source is Ge-68/Ga-68. This source is used due to its high kinetic energy and relatively long half-life.

According to another embodiment of method, the positron-emitting source is one of Na-22, F-18, FDG, or Rb-82.

According to another embodiment of method, the method further includes the step of imaging the annihilation target with the imaging system in order to determine a position and orientation of the annihilation target. The imaging can be PET, CT imaging, or MR, depending on whether the imaging system is a PET, PET/CT or PET/MR system.

According to another embodiment of method, the method further includes the step of determining, using a 3-D laser scanner, at least one of a position and orientation of the inner bore cover and a position and orientation of the detector surfaces.

According to another embodiment of method, the method further includes the step of calculating, using the position and orientation determined from the image, an expected pair-timing-difference for each line-of-response.

According to another embodiment of method, the method further includes the step of calculating, using the determined position and orientation determined from the 3-D laser scanner, an expected pair-timing-difference for each line-of-response.

According to another embodiment of method, the method further includes the steps of computing walk correction coefficients using the detected coincident event pairs, and calibrating the detector element using the walk correction coefficients.

According to another embodiment of method, the method further includes the steps of arranging the positron-emitting radioisotope source substantially at an iso-center of the imaging system, computing walk correction coefficients using the coincident event pairs originating from annihilations at the positron-emitting radioisotope source or at a source holder, and calibrating the detector element using the walk correction coefficients.

According to another embodiment of method, the method further includes the step of parallelizing the calculation of the walk correction coefficients such that events detected in opposite detector pairs are processed independently. The idea is that by using a source at iso-center, it becomes easy to parallelize the walk coefficient calculation using only data from opposing detector pairs.

According to another embodiment of method, the diameter of the cylindrical shell is at least 10 cm. This value is based on a determination described below and on the state-of-the-art in timing resolution for PET systems, for instance, targeting 200 ps.

Embodiments disclosed herein provide for an imaging system. The imaging system includes a positron-emitting radioisotope source arranged in or adjacent to an imaging region of the imaging system, an annihilation target arranged at a position separated from the positron-emitting radioisotope source by a predetermined distance, an imaging device configured to detect coincident event pairs resulting from annihilation of positrons at the annihilation target, calculation circuitry configured to compute a calibration time offset for a detector element of the imaging device based on the detected coincident event pairs, and calibration circuitry configured to calibrate the detector element with the completed calibration time offset.

According to another embodiment of system, the calculation circuitry is further configured to generate at least one pair-timing-difference histogram from the detected coincident event pairs and to compute the calibration time offset for the detector element using the at least one pair-timing-difference histogram.

According to another embodiment of system, the calibration time offset corresponds to the centroid of the pair-timing-difference histogram.

According to another embodiment of system, the calculation circuitry is further configured to compute the calibration time offset by applying a difference minimization technique.

According to another embodiment of system, the calculation circuitry is further configured to iteratively update the calibration time offset for each detector element until the difference between the measured centroid of the pair-timing-difference histogram and the expected pair-timing centroid for each detector element is below a preset threshold or until the absolute value of the centroid of the pair-timing-difference histogram for each detector element is below a preset threshold.

According to another embodiment of system, the positron-emitting radioisotope source is one of a point source and a line source.

According to another embodiment of system, the positron-emitting radioisotope source is outside of the field of view of the imaging system.

According to another embodiment of system, the annihilation target is an inner bore cover of the imaging system or is a surface of the detector in the imaging system.

According to another embodiment of system, the annihilation target is suspended within the field of view of the scanner.

According to another embodiment of system, the annihilation target is in the shape of a cylindrical shell.

According to another embodiment of system, the positron-emitting radioisotope source is positioned within the cylindrical shell.

According to another embodiment of system, the region between the positron-emitting radioisotope source and the annihilation are partially evacuated.

According to another embodiment of system, the annihilation target is positioned at least 5 centimeters from the positron-emitting radioisotope source.

According to another embodiment of system, the calculation circuitry is further configured to divide the pair-timing-difference histogram for each line-of-response into at least one region, with each region representing one intersection of the line-of-response with the annihilation target.

According to another embodiment of system, the calculation circuitry is further configured to apply a different time shift to each region, the time shift being calculated based on distances from intersection points to each detector element representing end points of the line-of-response.

According to another embodiment of system, the positron-emitting radioisotope source substantially is deposited uniformly over the inner surface of the cylindrical shell.

According to another embodiment of system, the positron-emitting radioisotope source is encapsulated in a resin.

According to another embodiment of system, the calculation circuitry is further configured to apply the positron-emitting radioisotope source to the inner surface in liquid form.

According to another embodiment of system, the liquid positron-emitting radioisotope source is mixed with gelatin or an adhesive type material, or the inner surface is made from an absorbent material.

According to another embodiment of system, the calculation circuitry is further configured to limit a field-of-view for forming coincident pairs such that when multiple intersections of any lines-of-response with the annihilation target exist, distances between subsequent intersections are extensive enough to allow for distinct regions to be identified from inspection of the pair-timing-difference histogram.

According to another embodiment of system, the positron-emitting source is Ge-68/Ga-68.

According to another embodiment of system, the positron-emitting source is one of Na-22, F-18, FDG, or Rb-82.

According to another embodiment of system, the imaging device is further configured to image the annihilation target with the imaging system in order to determine a position and orientation of the annihilation target.

According to another embodiment of system, the calculation circuitry is further configured to determine, using a 3-D laser scanner, at least one of a position and orientation of the inner bore cover and a position and orientation of the detector surfaces.

According to another embodiment of system, the calculation circuitry is further configured to calculate, using the position and orientation determined from the image, an expected pair-timing-difference for each line-of-response.

According to another embodiment of system, the calculation circuitry is further configured to calculate, using the determined position and orientation determined from the 3-D laser scanner, an expected pair-timing-difference for each line-of-response.

According to another embodiment of system, the calculation circuitry is further configured to compute walk correction coefficients using the detected coincident event pairs, and the calibration circuitry is further configured to calibrate the detector element using the walk correction coefficients.

According to another embodiment of system, the positron-emitting radioisotope source is arranged substantially at an iso-center of the imaging system, the calculation circuitry is further configured to compute walk correction coefficients using the coincident event pairs originating from annihilations at the positron-emitting radioisotope source or at a source holder, and the calibration circuitry is further configured to calibrate the detector element using the walk correction coefficients According to another embodiment of system, the calculation circuitry is further configured to parallelize the calculation of the walk correction coefficients such that events detected in opposite detector pairs are processed independently.

According to another embodiment of system, the diameter of the cylindrical shell is at least 10 cm.

The present embodiments provide good timing resolution enabling the TOF PET scanner to effectively reduce the statistical noise in the reconstructed images to improve the image quality. The coincidence timing offset is determined for each individual crystal in order to achieve good timing resolution for the TOF PET scanner. In addition, the walk correction coefficient, which characterizes the energy dependence of coincidence timing, is calibrated for each individual crystal in order to optimize the timing resolution for the TOF PET scanner.

The timing offset and the walk correction coefficient are calibration parameters which are used to convert the measured time stamp of an individual detected gamma ray to a calibrated time stamp. For example:

$$t_{calibrated} = t_{measured} + t_{offset} + W^*(E_{measured} - E_{511 keV})$$ [equation 1]

where:

$t_{calibrated}$ is the calibrated time stamp;
$t_{measured}$ is the measured time stamp;
$t_{offset}$ is the timing offset;
W is the walk correction coefficient;
$E_{measured}$ is the measured integrated signal of the gamma ray; and
$E_{511 keV}$ is the integrated signal for a 511 keV gamma ray.

In equation 1, the walk correction is performed with a single coefficient representing a linear dependence between the measured energy and the time walk. While a linear correction generally performs well and is sufficient over the energy range of interest (i.e. near 511 keV in PET), higher order polynomials or other functional forms can be used to implement the walk correction.

The timing offset calibration may be obtained when one crystal is coupled by coincident gamma photons to a number of other crystals. In light of this, a widely distributed source of coincident gamma photons ensures that each crystal is coupled to many other crystals. To reduce count requirements, the source of coincident gamma photons may have a short spatial extent in the direction along the lines of response (LORs) which are of interest.

In the present embodiments, such a distributed source of coincident gamma photons is created using a positron-emitting source and a spatially separated annihilation target. The intended separation between source and target could be, for example, on the order of several 10's of cm. A few examples of the annihilation target(s) are 1) a shield placed outside the radiation source(s) and suspended in the scanner field of view (FOV), 2) a PET scanner cover, and 3) PET detectors.

Figure 2:
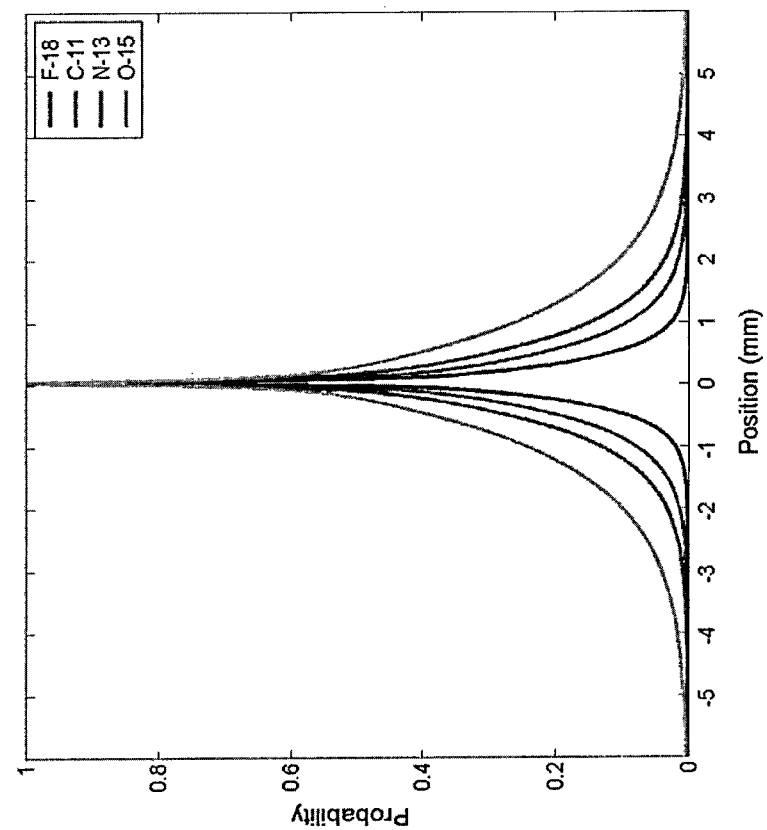
FIG. 2 illustrates a Full-Width-at-Tenth-Maximum plot corresponding to the distribution of annihilation positions.

As will be described below, creating a distributed source of coincident gamma photons using the present embodiments provides certain advantages over previous embodiments. The present embodiments are distinguished from previous embodiments by the fact that in the present embodiments the positrons travel substantial distances, generally through air or a partial vacuum, before annihilating in a spatially separate target. Spatially separate in this context may correspond to a several centimeter separation from the positron-emitting source, for example. The distance between positron-emitting source and annihilation target in the present embodiment is generally on the order of 5 cm or larger. In the past, the positron emitter has been embedded or contained by a material such as water, acrylic (plastic), aluminum, steel, or copper, and almost all of the positron annihilations occurred in the material immediately surrounding the positron-emitting source. The characteristic distance that positrons travel before annihilating is referred to as the positron range. The positron range will depend on both the isotope (due to differences in mean kinetic energy of the emitted positrons) and on the material in which it is traveling (described by, for example, effective atomic density, effective atomic weight, and effective atomic number). As an example, FIG. 2 illustrates the distribution of positron annihilation sites in water for several positron-emitting radionuclides. The Full-Width-at-Tenth-Maximum (FWTM) calculated from these distributions is one way to describe the positron range. Other techniques may also be used to describe the positron range, such as calculating a root-mean-square distance, for example. Table 1 below illustrates an example of the positron range in FWTM for a number of different isotopes and in different materials.

As mentioned above, in the present embodiments, the distance between positron-emitting source and the annihilation target is on the order of 5 cm or larger. This is possible because in the present embodiments the positron-emitting source is packaged in such a way that the positrons are able to reach air or partial vacuum within a very short distance of being emitted. Once the positrons have reached air, their range is on the order of meters (as indicated in Table 1) and most will reach the spatially separated annihilation target. In the previous embodiments, where the positron-emitting source is embedded in a solid or liquid, the range is on the order of millimeters. Taking the highest energy emitter listed in Table 1 (Ge-68/Ga-68) and the solid or liquid material with the longest range (water), the maximum distance between emission and annihilation in previous embodiments would be on the order of 5 mm or less, which is a factor of ten smaller than the minimum separation between the positron-emitting source and the annihilation target typically used in the present embodiments.

In order to ensure that enough positrons reach the annihilation target(s), the source holder(s) may be designed to only cause small attenuation to the positrons. One example of such as system is a very thin-walled stainless steel hypodermic (such as 16-RW gauge or thinner-walled). In addition, the radioactive isotope may have a relatively large positron range (i.e. high kinetic energy, such as Ge-68/Ga-68). The radioactive isotope could originate in a liquid form and be contained in a low-attenuation (for positrons) material (such as absorbent paper) or on the surface of another material.

After data acquisition, the timing offset can be calibrated by applying annihilation position correction to the data. The timing walk can then be calibrated by applying the annihilation position correction and the timing offset correction to the data.

Timing calibration can be performed utilizing data resulting from a positron annihilation happening at the shield outside the radiation source(s). For example, if the radiation source(s) are placed inside the FOV, the distance between radiation source(s) and the shield needs to be large enough, so that the positron annihilation in the source (holder) and the shield are separated. The shield outside the radiation source(s) could be sealed and evacuated, which could reduce the positron annihilation in the air and increase the number of positrons reaching the shield.

Figure 3:
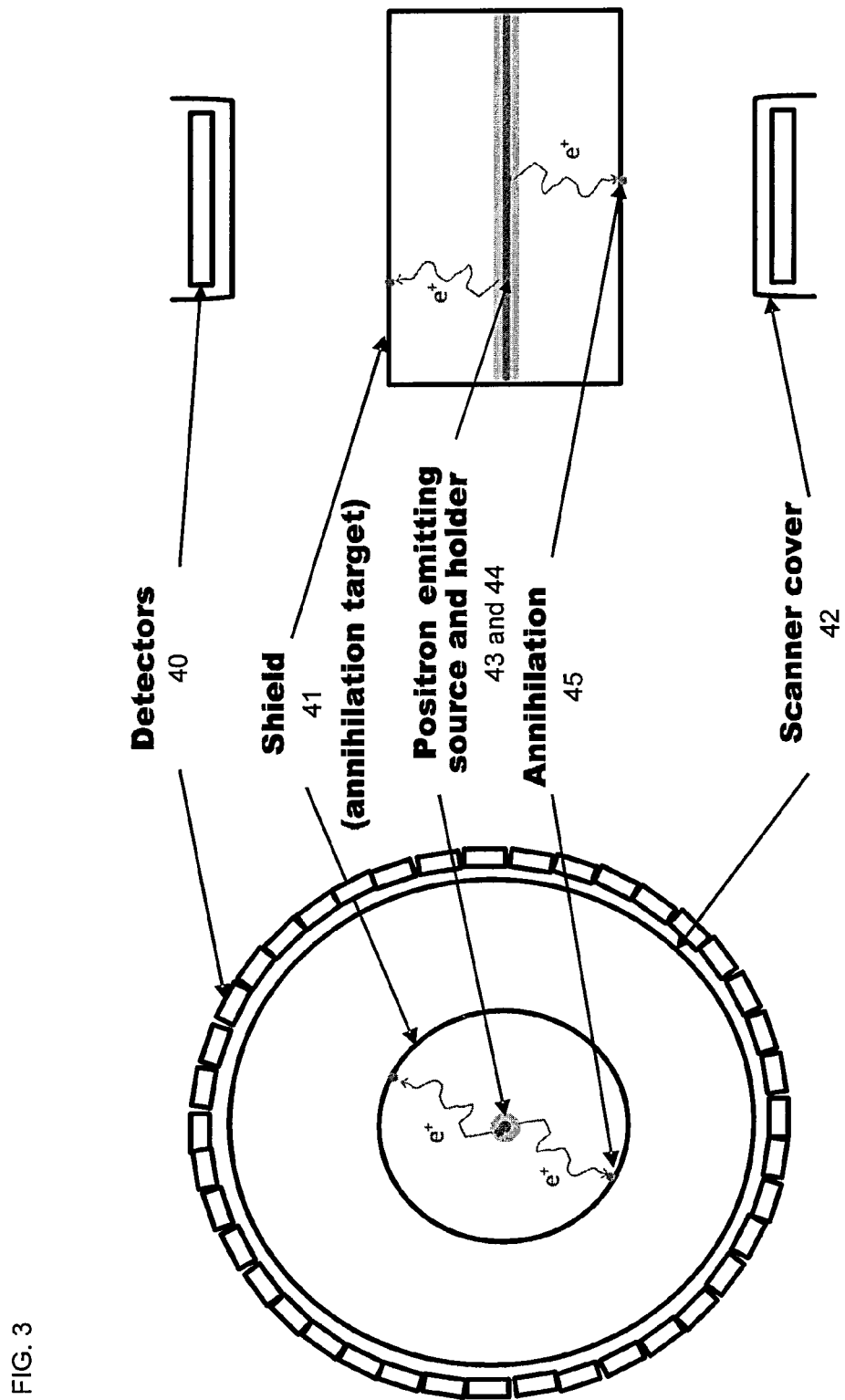
FIG. 3 shows an imaging system having a positron emitting source and a shield according to one embodiment.

Referring now to the drawings, wherein like reference numerals designate identical or corresponding parts throughout the several views, FIG. 3 shows an example arrangement of detector modules 40 in a PET scanner. Any number of detector modules can be used within the scope of the disclosed embodiments. In the example shown in FIG. 3, the shield 41 is positioned within the ring of detectors 40. Between the shield 41 and the detectors 40 is the scanner cover 42. In the example shown in FIG. 3, the shield 41 is the annihilation target. Within the shield is placed the positron emitting source 43 and holder 44. In this example, the positrons escape the holder 44 and are annihilated 45 at the shield 41.

In this figure, the positron annihilation occurs in the shield 41 outside the radiation source. A line source placed at the scanner center was used. FIG. 3 illustrates a front view of the scanner on the left and a side view of the scanner on the right. As was noted above, the positron-emitting source may be Ge-68/Ga-68 enclosed in a 16RW-gauge (or thinner) stainless steel hypodermic tube, for example. The annihilation target may be designed to be high enough density to stop the

TABLE 1

| Isotope | Emax | Air | Water | Acrylic | Al | Fe | Copper |
|---|---|---|---|---|---|---|---|
| F-18 | 635 keV | 933 mm | 1.03 mm | 0.90 mm | 0.44 mm | 0.16 mm | 0.14 mm |
| C-11 | 970 keV | 1684 mm | 1.86 mm | 1.62 mm | 0.80 mm | 0.28 mm | 0.25 mm |
| N-13 | 1190 keV | 2291 mm | 2.53 mm | 2.21 mm | 1.08 mm | 0.39 mm | 0.34 mm |
| O-15 | 1720 keV | 3749 mm | 4.14 mm | 3.61 mm | 1.77 mm | 0.63 mm | 0.56 mm |
| Ge-68/Ga-68 | 1900 keV | 4227 mm | 4.66 mm | 4.06 mm | 1.99 mm | 0.71 mm | 0.64 mm | positrons after a short distance (for small spatial extent of annihilation region), but is also designed to minimize the attenuation of the 511 keV gamma rays emitted by the annihilation event. The annihilation target may also be a plastic (few mm) or thin (~mm) metal cylinder (other shapes, such as spheres or rectangular prisms are possible).

Figure 4:
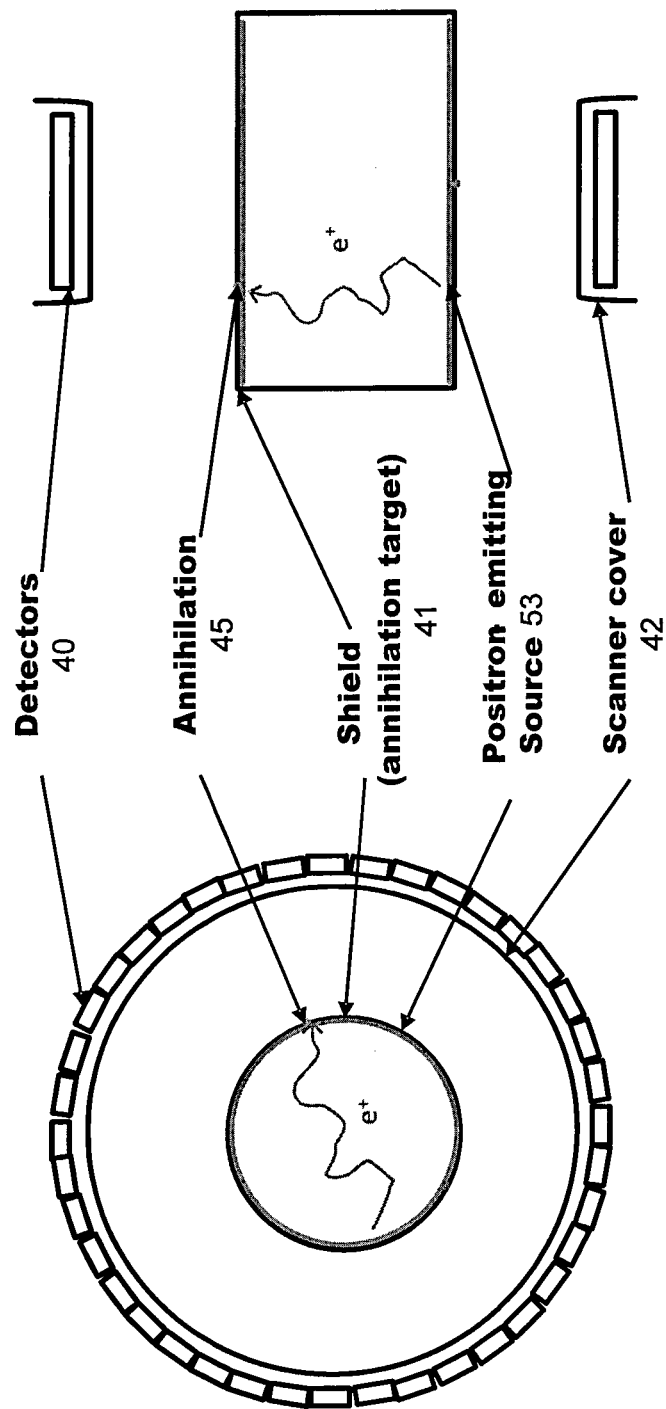
FIG. 4 shows an imaging system having a positron emitting source and a shield according to another embodiment.

FIG. 4 illustrates another exemplary embodiment of an arrangement of detector modules 40 and scanner cover 42 in a PET. FIG. 4 illustrates a front view of the scanner on the left and a side view of the scanner on the right. The positron annihilation occurs at the shield 41 outside the radiation source 53. In this example, a positron-emitting isotope 53 is coated on the inner surface of the annihilation target 41. The source could be Ge-68/Ga-68 deposited uniformly on the inner surface, or contained in a hardened resin/epoxy on the surface, or could be Fluorodeoxyglucose ($18^F$) ("FDG") coated on the surface. To increase the adhesion of FDG, the FDG could be mixed in gelatin or the inner surface of the target could be made from an absorbent material. Other liquid sources are also possible.

Figure 5:
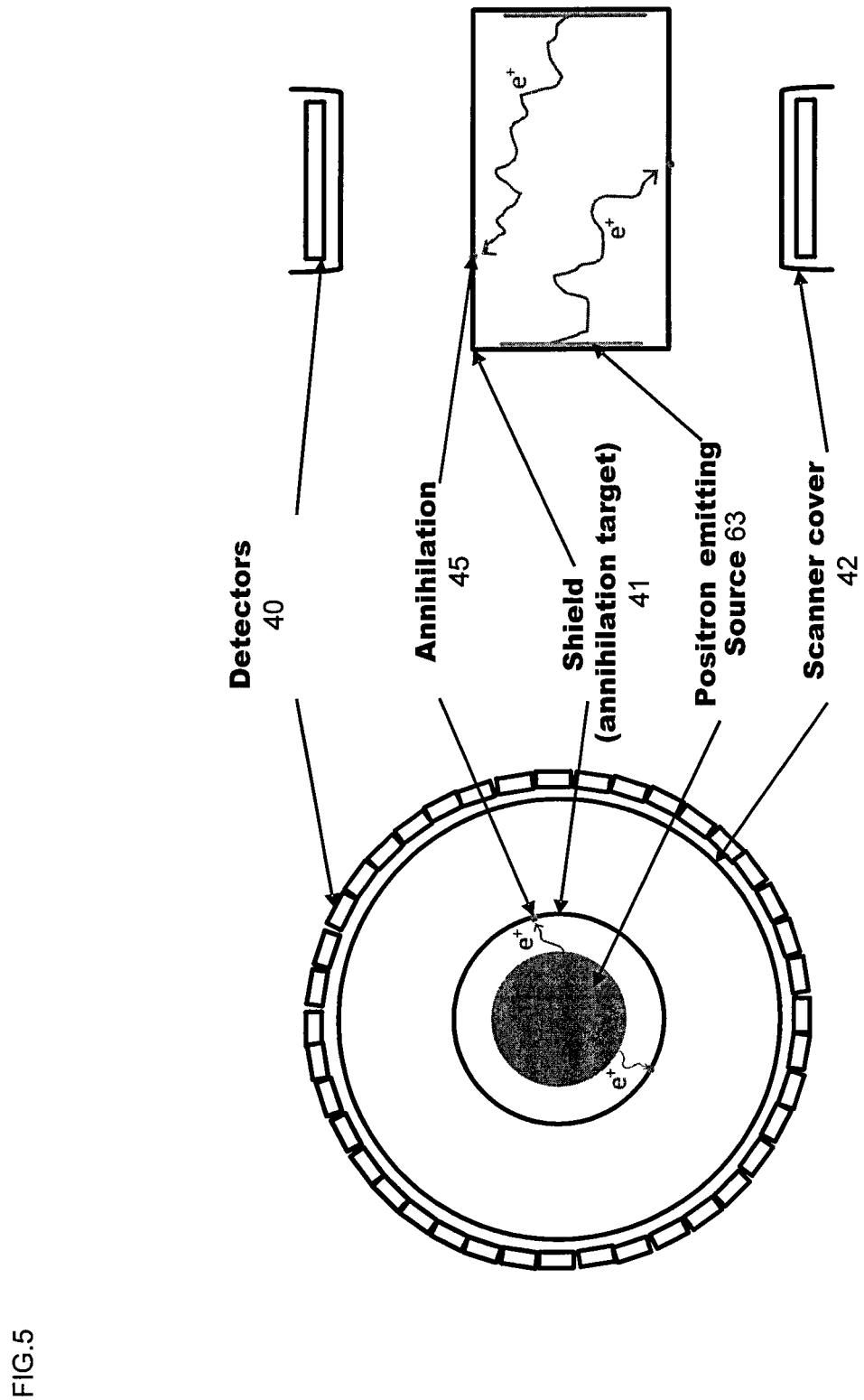
FIG. 5 shows an imaging system having a positron emitting source and a shield according to another embodiment.

FIG. 5 illustrates another exemplary embodiment of an arrangement of detector modules 40 and scanner cover 42 in a PET scanner. FIG. 5 illustrates a front view of the scanner on the left and a side view of the scanner on the right. The positron annihilation 45 occurs at the shield 42 outside the radiation source 63. In this example, the positron-emitting isotope 63 is located outside of the field-of-view of the scanner. Additionally, the annihilation target 41 can be sealed, and a way provided to (at least partially) evacuate the air from the sealed shield (e.g. a cylinder). This will increase the positron range and, thereby, increase the number of positrons which annihilate in the target 41 (rather than in the air). The sealing of the shield and evacuation can be applied to other embodiments as well.

Figure 6:
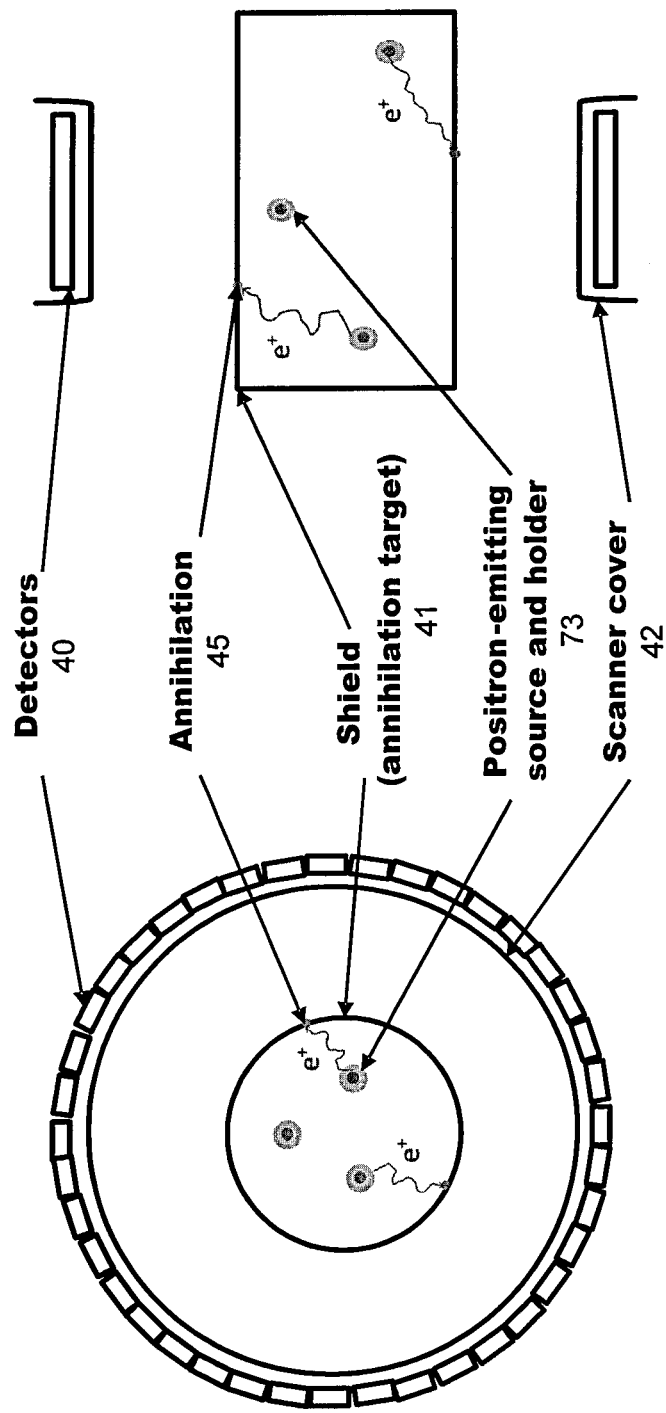
FIG. 6 shows an imaging system having positron emitting sources and a shield according to one embodiment.

FIG. 6 illustrates another exemplary embodiment of an arrangement of detector modules 40 and scanner cover 42 in a PET scanner. FIG. 6 illustrates a front view of the scanner on the left and a side view of the scanner on the right. The positron annihilation 45 occurs at the shield 41 outside the radiation sources 73. For example, any positron emission sources with large positron range could be used.

Figure 7:
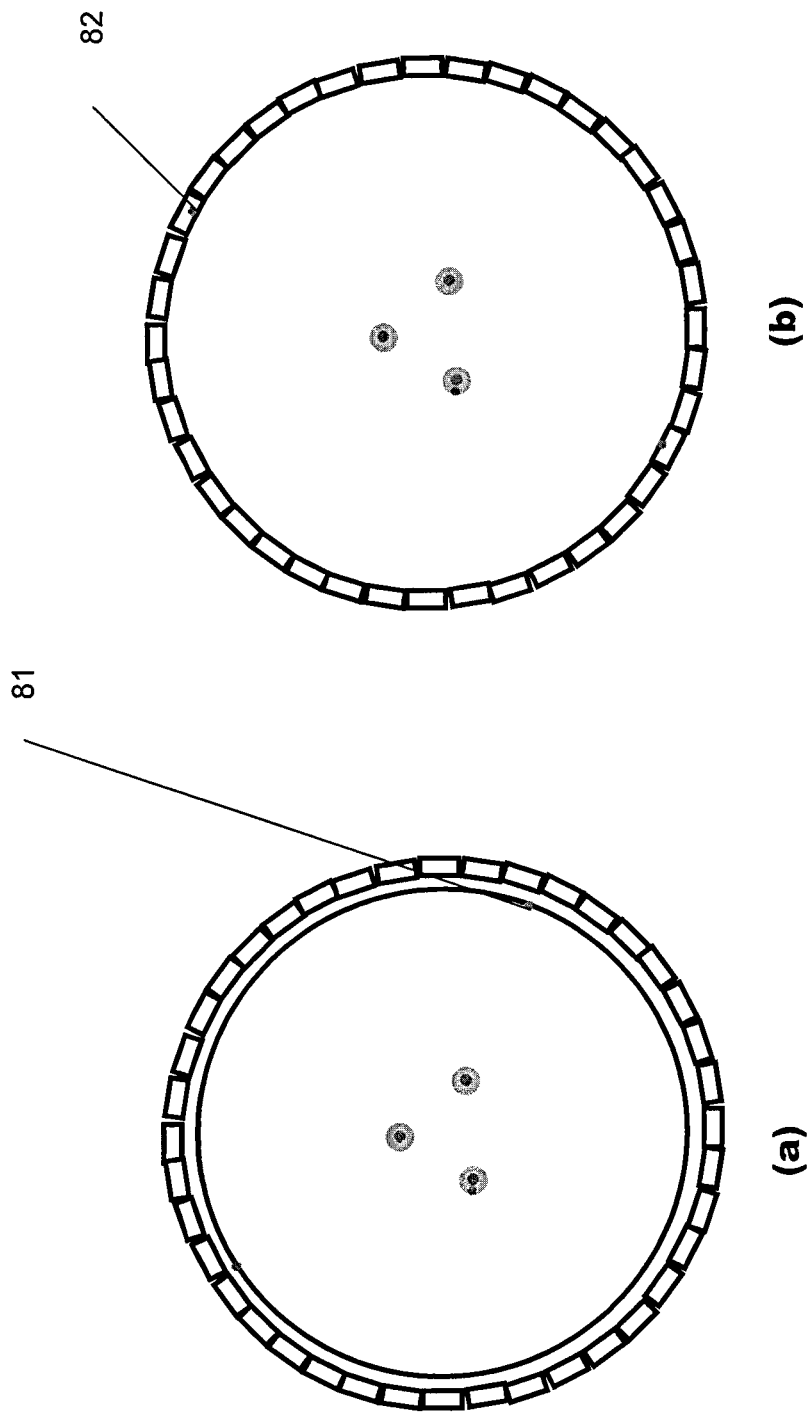
FIGS. 7(a) & 7(b) show imaging systems having no shield and no scanner cover according to a plurality of additional embodiments.

Timing calibration could be also performed utilizing data consisting of positron annihilation happening in the scanner cover or PET detector. FIGS. 7(a)&(b) illustrate an example of this embodiment in which the positron annihilation 81/82 occurs at either of the scanner cover 81 or any of the PET detectors 82. Any positron emitting source(s) with a sufficiently large positron range could be used in this example. FIG. 7(a) illustrates an example in which the scanner cover is included and FIG. 7(b) illustrates an example in which the scanner cover is removed.

Figure 8:
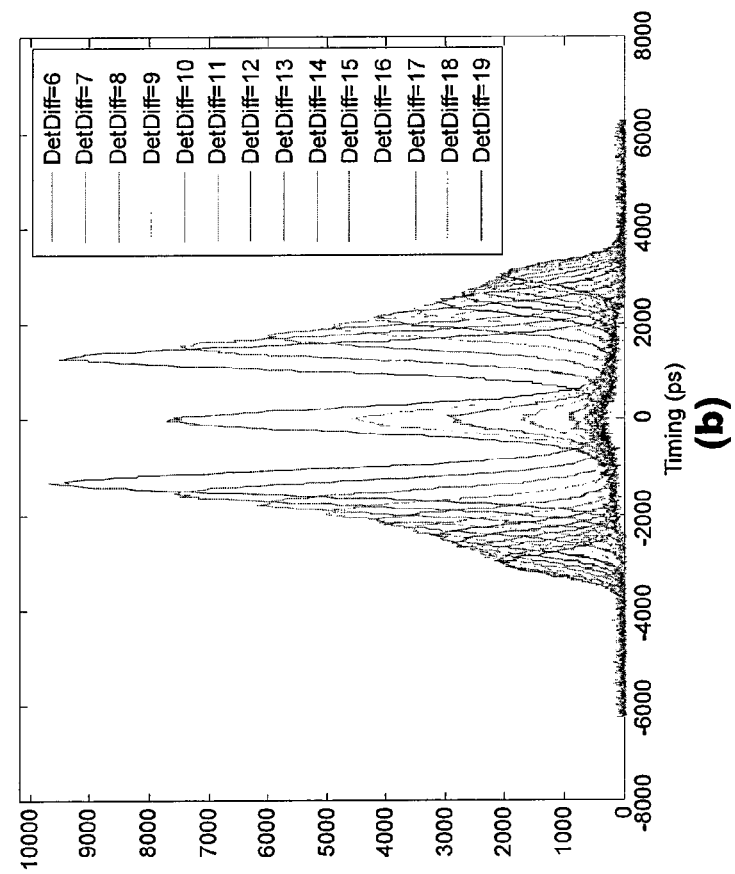
FIG. 8(a) shows an example in which the positron emitting source is in the iso-center of the imaging device field of view.
FIG. 8(b) shows a time of flight histogram for different detector pairs.
Figure 8:
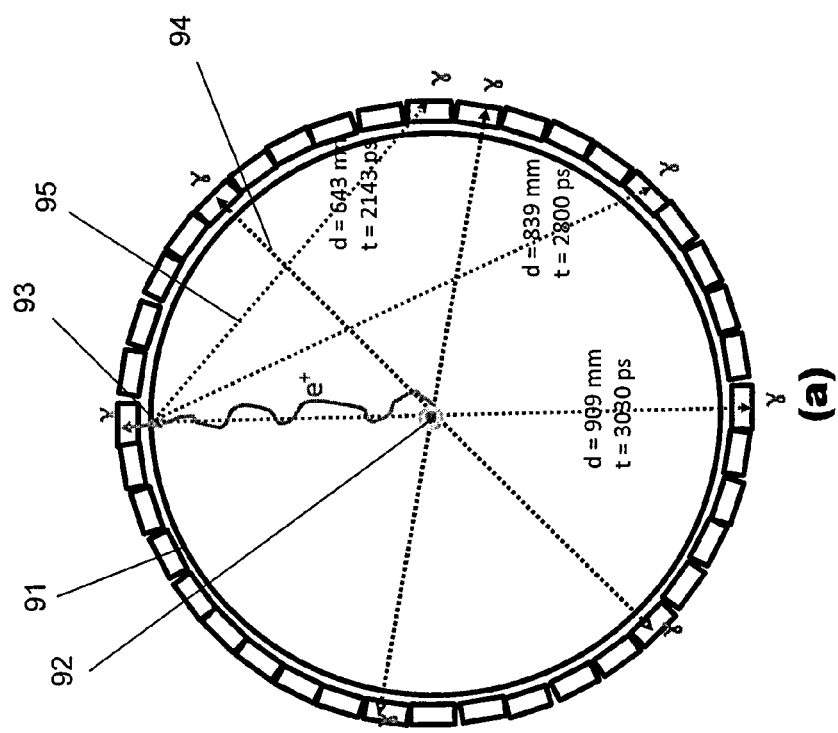

FIGS. 8(a)&(b) illustrate another example in which no shield is in place and which the annihilation takes place at the scanner cover 91. In this example, the point source 92 is placed at the iso-center of the scanner FOV. The positron annihilation 93 at the scanner cover may be used, for example, for timing offset calibration. The positron annihilation in the source/source holder could be used for timing walk calibration. Some positrons annihilate in the source (holder), shown as the dark lines 94; while some positrons annihilate in the scanner cover, shown as the light line 95.

FIG. 8(b) illustrates a time of flight ("TOF") histogram (pair-timing-difference histogram) for different detector pairs. The positrons annihilating at the source (holder) show up as the central peak of the TOF histogram (pair-timing-difference histogram). The positrons annihilating in the scanner cover could be detected by detector pairs with different distance and show up as sidelobes in the TOF histogram (pair-timing-difference histogram).

Figure 9:
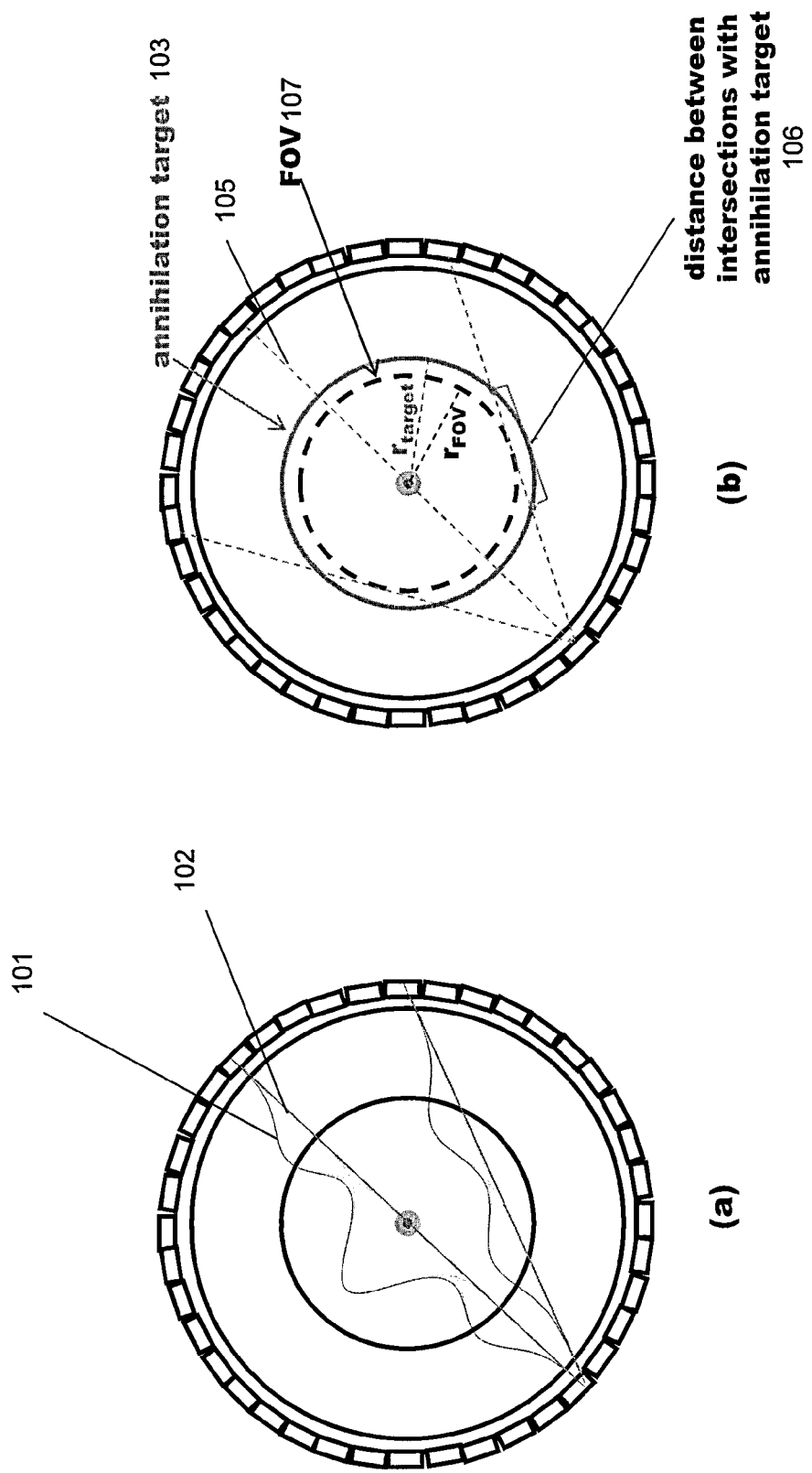
FIG. 9(a) illustrates an example of lines of response and corresponding uncalibrated timing spectra (pair-timing-difference histogram)
FIG. 9(b) illustrates a radius of the annihilation target and the radius of the coincidence pairing field-of-view.

FIG. 9(a) illustrates an example of lines of response (LORs) 102 and corresponding (uncalibrated) timing spectra (pair-timing-difference histogram). FIG. 9(b) illustrates that if the radius of the annihilation target ($r_{target}$) is chosen so that three peaks will be resolved along central LORs 105, then a reasonable FOV 107 can be defined based on having the shortest distance between intersections equal to $r_{target}$. For example, $r_{ROV}$=sqrt(3)/2*$r_{target}$, with the distance 106 between intersections with the annihilation target equaling $r_{target}$. Along any given LOR, it is preferable that multiple intersection points with the annihilation target (or source/source holder) should be separated by a distance determined by the uncalibrated timing resolution. Consider, for example, the two LORs 102 shown in FIG. 9(a), in this example, if the radius of the annihilation target is chosen so that three intersections are resolved for LORs passing through source/holder, then FIG. 9b shows how a reasonable FOV for acquisition and analysis can be defined (other FOVs, particularly smaller, are possible).

The processing of the data to determine the timing offsets for each crystal is generally an iterative process. During each iteration, a timing difference histogram (pair-timing-difference histogram) is formed for all of the coincident events detected in each crystal. This is a histogram of the difference between the measured time difference and the time difference that is expected given the geometry. For example, for a single point source at the center of the scanner, the expected time difference will be zero for all LORs passing through the source. For other source positions, the expected time difference can be calculated (the position/orientation of the source/target can either be known a-priori, or the position/orientation can be determined by imaging, or by use of a 3-D laser scanning method, for example). Based on the time difference histogram (pair-timing-difference histogram) (generally from the centroid), the timing offset of each crystal is updated in each iteration, and iterations are continued, for example, a) for a fixed number of iterations, b) until the change in each iteration is below a preset threshold, or c) until the absolute values of the centroids of all the histograms are below a preset threshold.

When a given LOR has multiple intersections with the annihilation target (or the source/source holder), as shown in FIG. 10(a), different "expected time differences" can be defined for different regions of the timing spectrum. In this example, the difference between the measured time difference and the "expected time difference" is able to be calculated for each event based on the LOR/target geometry and the region of the timing spectrum (i.e. a "corrected time difference"). Time difference spectra can then be generated for each LOR and summed to form the final time difference spectra for a given crystal, or a final time difference spectra can be generated directly by histogramming all of the "corrected time differences" for events in a given crystal.

Figure 10:
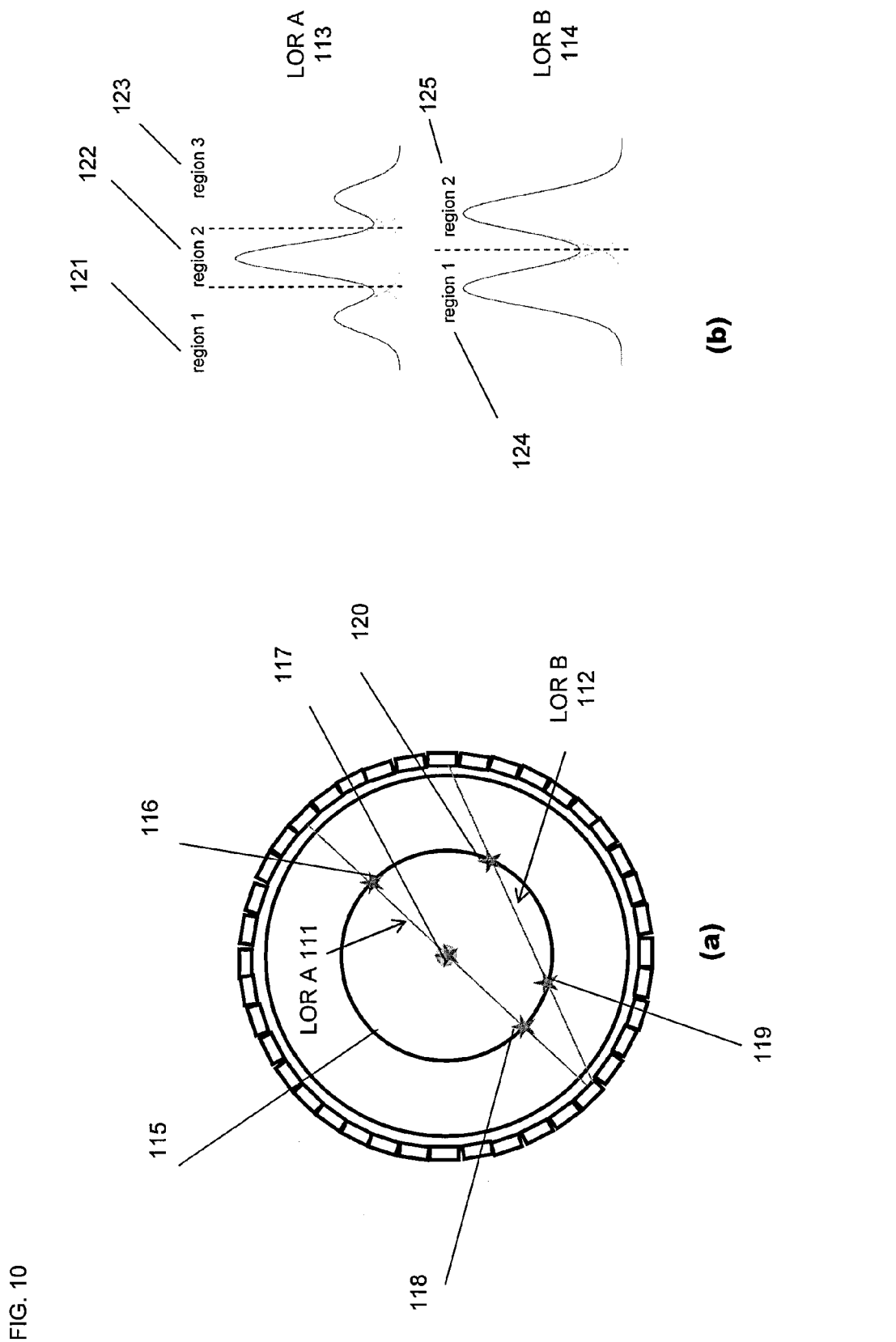
FIG. 10(a) illustrates two possible lines of response.
FIG. 10(b) illustrates timing spectra (pair-timing-difference histogram) corresponding to the lines of response.

FIG. 10(a) illustrates two possible LORs 111 and 112. LOR A 111 has three intersection points 116-118 with the target and/or source/source holder 115. LOR B 112 has two intersection points 119 and 120 with the target and/or source/source holder 115. FIG. 10(b) illustrates corresponding timing spectra (pair-timing-difference histogram) LOR A 113 and LOR B 114, which respectively correspond to LORs 111 and 112. In addition, each uncalibrated timing spectra (pair-timing-difference histogram) 113 and 114 has regions 121-125 respectively corresponding to an intersection. For example, region 1 in timing spectra (pair-timing-difference histogram) 113 corresponds to intersection 118. In addition, each region in FIG. 10(*b*) has a different "expected timing difference".

Figure 11:
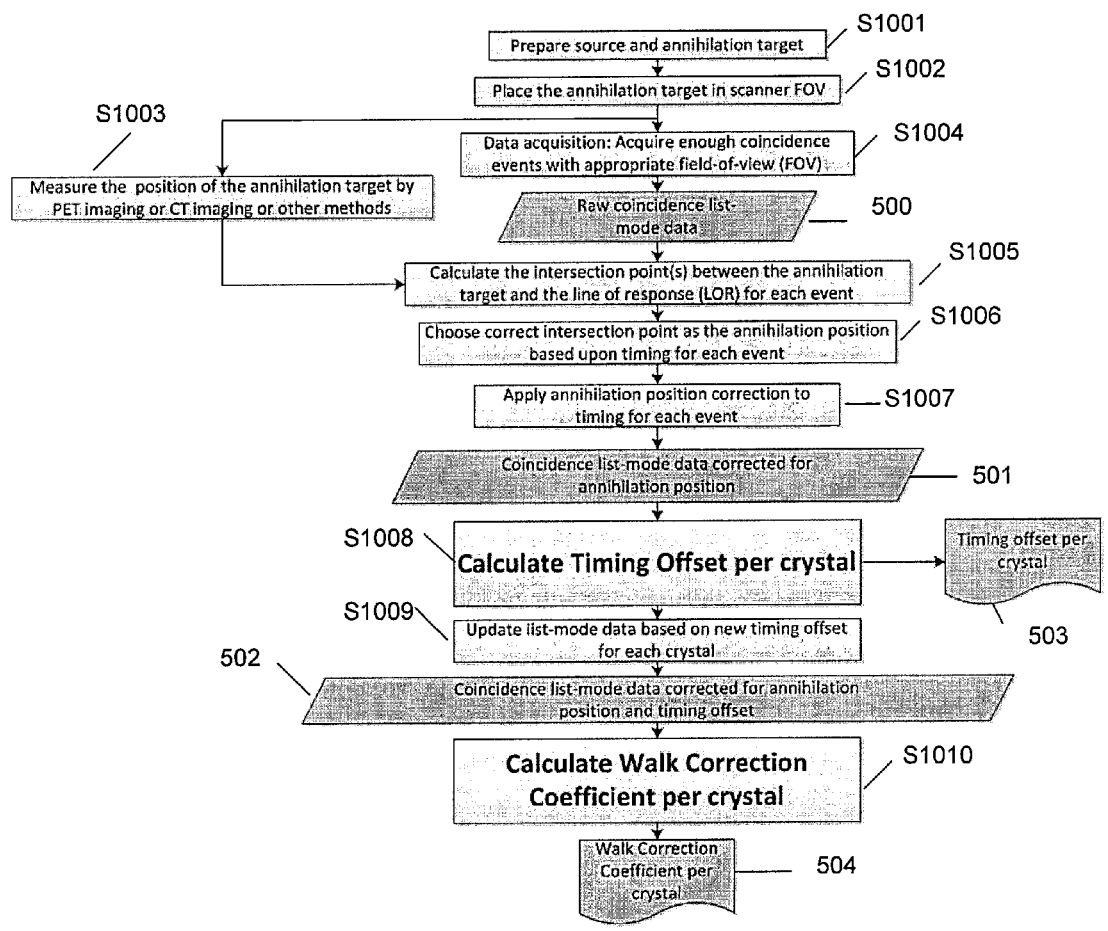
FIG. 11 shows a flow diagram illustrating a method according to one embodiment.

FIG. 11 illustrates a flow diagram illustrating a method of calculating the timing offset and walk correction coefficient per crystal according to one embodiment. In step S1001, the source and annihilation target is prepared. The preparation of the source and annihilation target may correspond to any of the embodiments described in FIGS. 3-7.

In step S1002, the annihilation target is placed in the scanner FOV. In particular, the positron-emitting source(s) may be placed in or outside the scanner FOV.

In step S1003, the position of the annihilation target is measured. For instance, when implementing positron annihilation at the source (holder), the accurate position of the source(s) preferable is known or determined. For example, the position can be determined from imaging. When implementing positron annihilation at the shield, the shield is preferably positioned outside the source(s). The geometry and position of the shield preferably is known or determined. For example, the geometry and position can be determined from imaging or from a 3-D laser scan. When implementing positron annihilation at the scanner cover, the geometry and position of the scanner cover preferable is known. When implementing positron annihilation at the detectors, the scanner cover is removed and the positions of the detectors are preferably known. Each of these implementations may be determined based on an estimation of the position of the annihilation target in an alternate embodiment. In this case, the accuracy of the estimation will influence the quality of the timing calibration.

If multiple annihilation positions are possible along a single LOR, then there is preferably enough space between the different possible annihilation positions, e.g. between source(s) and shield, or between source(s) and scanner cover, so that the events occurring at different locations can be separated in the timing spectra (pair-timing-difference histogram).

In step S1004, the data acquisition is performed. In particular, a sufficient number of coincidence events are acquired with appropriate FOV. The data acquisition FOV should be on the order of the size of annihilation target or slightly larger. However, if the geometry of the annihilation target can result in multiple annihilations along a single LOR, then the FOV can be limited so that only events which are spatially separable are acquired. For instance, see the discussion with regard to FIGS. 9(*a*)&9(*b*). In addition, the number of positron annihilation events is preferably large enough to calibrate the peak position from the timing difference histogram (pair-timing-difference histogram) for each of the crystals.

The result of steps S1001, S1002, and S1004 is the raw coincidence list-mode data 500. This data is used by step S1005 to calculate the intersection point(s) between the annihilation target and the line or response for each event. In step S1006, the correct intersection point is chosen as the annihilation position based upon the timing for each event. In step S1007, the annihilation position correction is applied to the timing for each event. The result of these steps is the corrected coincidence list-mode data 501 which is corrected for the annihilation position.

Figure 12:
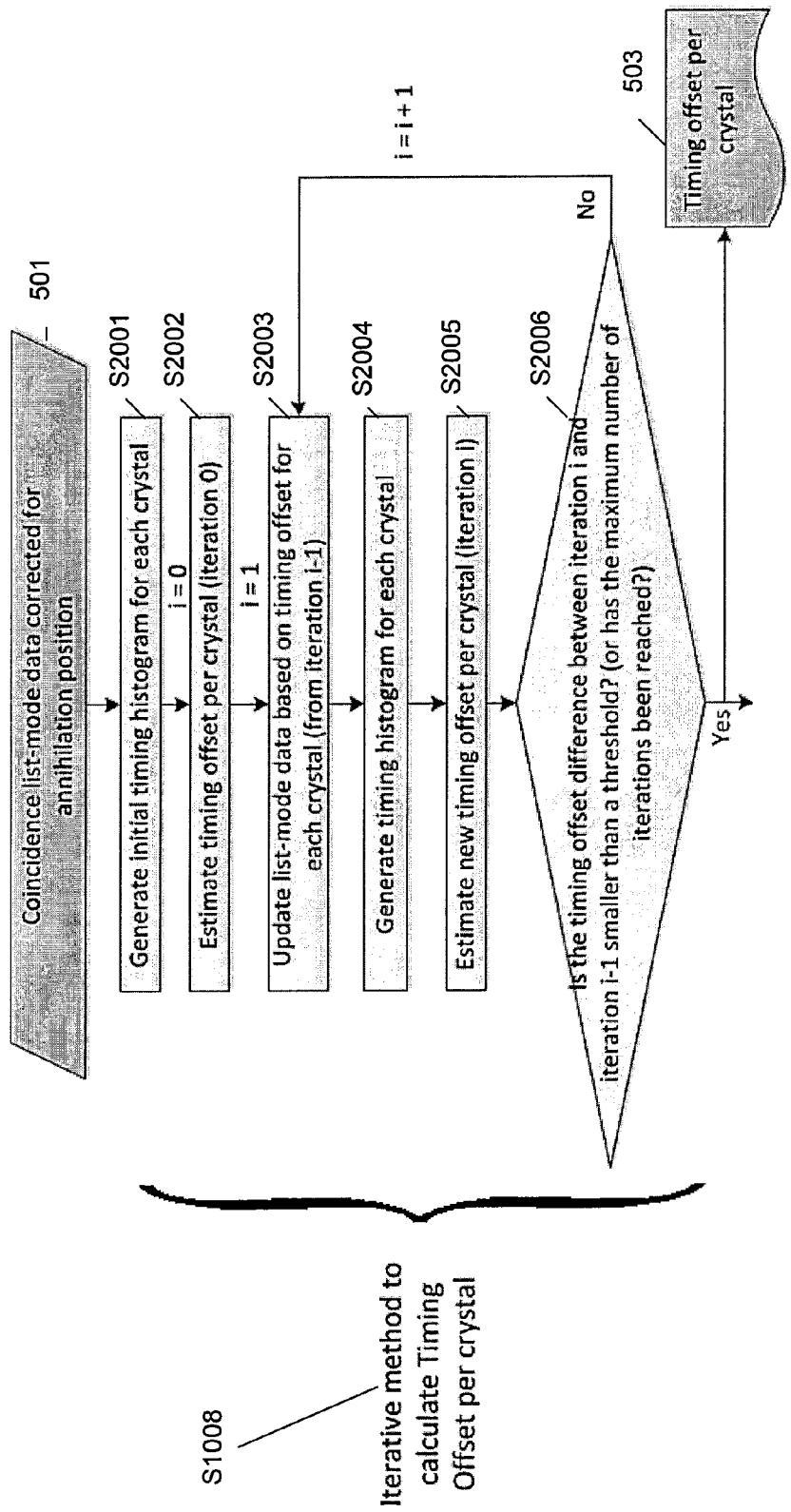
FIG. 12 shows a flow diagram illustrating a more detailed view of the step of calculating timing offset per crystal.

This data 501 is used by step S1008 to calculate the timing offset per crystal 503. FIG. 12 provides a more detailed view of the calculation of the timing offset per crystal. Specifically, FIG. 12 describes an iterative method for calculating timing offset per crystal.

The timing offset per crystal can be calculated from data consisting of positron annihilation occurring at any location(s), when one crystal is coupled to a number of crystals on the other side. The annihilation position correction is applied to the TOF difference of all the events (may require defining different regions in time difference if LOR intersects with target/source in multiple places). The timing offset per crystal is then calculated by finding the peak position of the TOF histogram (pair-timing-difference histogram) for each crystal. The TOF difference for the timing offset per crystal is calculated and the process is repeated until the sequence converges. The final timing offset per crystal is the sum over the timing offset per crystal calibrated in all iterations.

This process is illustrated in FIG. 12. In particular, in step S2001, the initial timing histogram (pair-timing-difference histogram) is generated for each crystal. In step S2002, the timing offset per crystal is estimated. In step S2003, the list-mode data is updated based on the timing offset for each crystal. In step S2004, the timing histogram (pair-timing-difference histogram) for each crystal is generated. In step S2005, the new timing offset per crystal is estimated. Finally, in step S2006, it is determined whether the timing offset difference between the present iteration and the previous iteration is smaller than a threshold or if the maximum number of iteration has been reached. If either of these determinations results in a positive result then the timing offset per crystal 503 is generated. If neither of these determinations results in a positive result, then the flow returns to step S2003 to repeat the process.

Once the timing offset per crystal is generated, the flow proceeds to step S1009 in FIG. 11. In this step, the list-mode data is updated based on the new timing offset for each crystal. This generates the coincidence list-mode data 502 corrected for annihilation position and timing offset.

Figure 13:
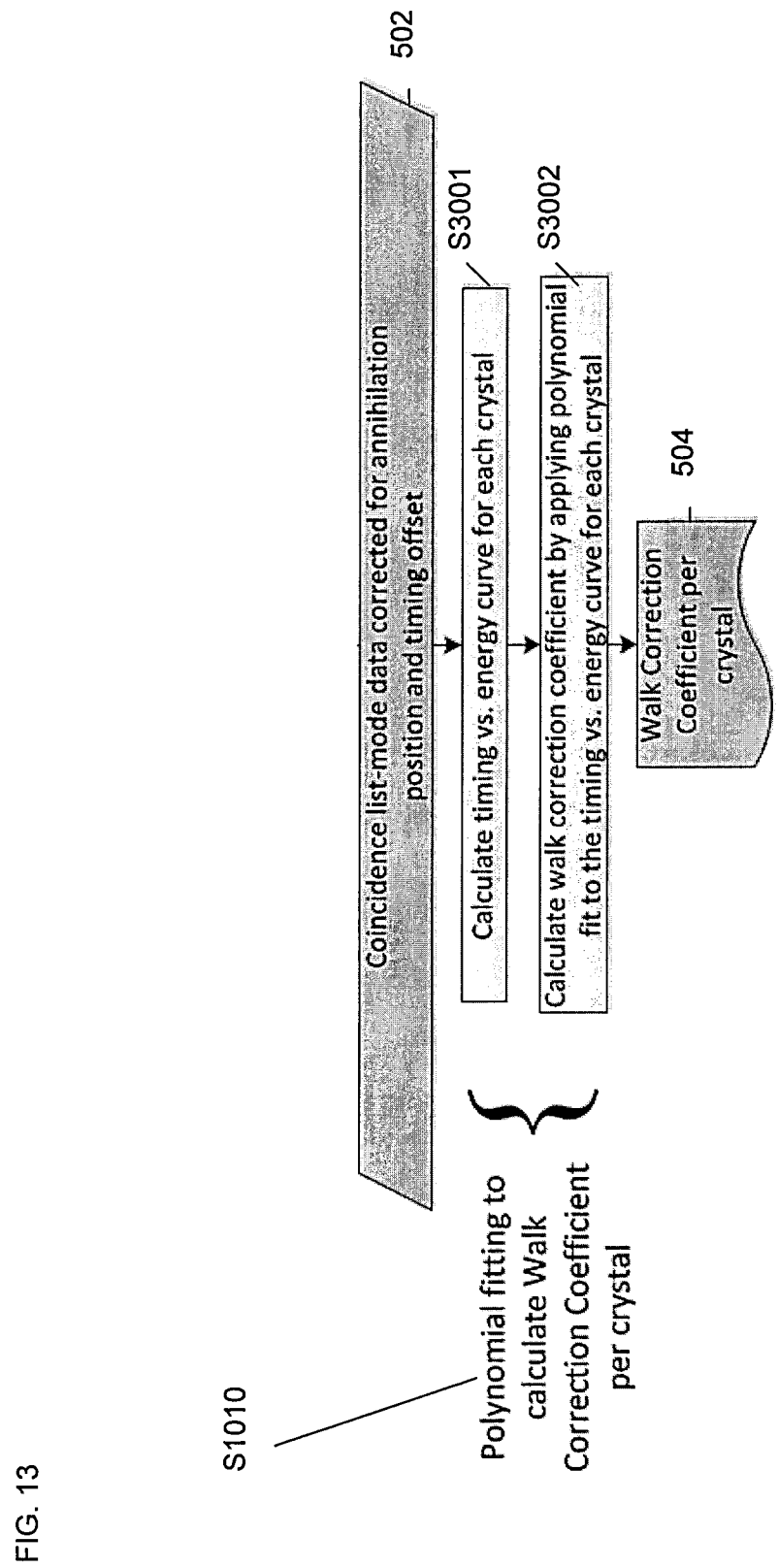
FIG. 13 shows a flow diagram illustrating a more detailed view of the step of calculating the walk correction coefficient per crystal.

This data 502 is then used by step S1010 to calculate the walk correction coefficient per crystal. FIG. 13 provides a more detailed view of the calculation of the walk correction coefficient per crystal. In particular, this figure illustrates polynomial fitting to calculate the walk correction coefficient per crystal.

The timing walk correction coefficient per crystal may be calibrated from the data consisting of positron annihilation occurring at any location(s) after applying annihilation position correction and timing offset correction. When the data consists of positron annihilation happening at the iso-center of the scanner, parallel processing may be used to speed up the data analysis process. For example, data may be split into a number of sections (e.g., 20 detector pairs for a system consisting of 40 detector modules). The walk correction coefficients for different sections of data could be calibrated in parallel. For each section of data, annihilation position correction and timing offset correction may be applied to the data. For each specific crystal, the TOF vs. energy curve may be generated and the LORs connecting this specific crystal and any crystals on the other side are considered. For each specific crystal, the walk correction coefficient per crystal is calculated by applying polynomial fit to the TOF-energy curve for that crystal.

This process is illustrated in FIG. 13. In particular, in step S3001, the timing vs. energy curve for each crystal is calculated. In step S3002, the walk correction coefficient is calculated by applying polynomial fit to the timing vs. energy curve for each crystal. This generates the walk correction coefficient per crystal 504.

Figure 14:
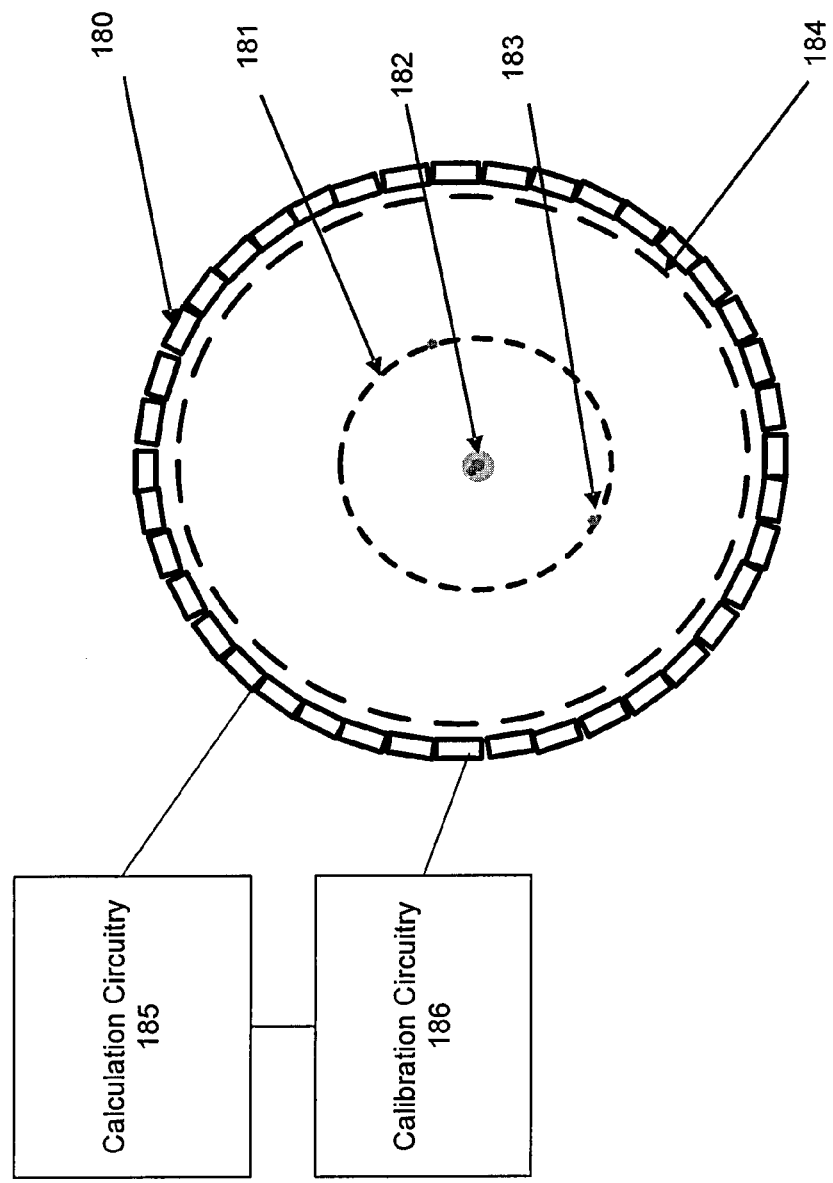
FIG. 14 illustrates a block diagram corresponding to an imaging system according to one embodiment.

FIG. 14 illustrates an exemplary embodiment of an imaging system. In this illustration, the imaging system includes detector modules 180 in a PET scanner, for example. There is optionally included a scanner cover 184 and a shield 181. Each of these elements (180, 181 and 184) may operate as the annihilation target 183. Once the coincident event pairs resulting from annihilation of positrons at the annihilation target is detected this information is input to the calculation circuitry 185. The calculation circuitry 185 uses this information to compute a calibration time offset for each detector element in the imaging system based on detected coincident event pairs. The completed calibration time offset is then input to the calibration circuitry 186, which calibrates the detector elements with the completed calibration time offset based on equation 1. For example, the offset values for each crystal (and walk coefficients) are loaded into memory in circuitry in the detector. Then for each detected event, the measured time stamp is converted to a 'calibrated' time stamp using equation 1. The calculation circuitry 185 and the calibration circuitry 186 may be implemented by a programmed computer having a microprocessor or by hardware circuitry.

The preset embodiments provide significant advantages not seen in the past. For example, as compared to introducing light pulses into the PMTs, in the present embodiments no additional hardware are needed, and the entire detector and electronics system is calibrated.

As compared to using a radioactive source embedded in a plastic scintillator coupled to a PMT, in the present embodiments no additional acquisition electronics are needed and more accurate timing calibration can be achieved.

As compared to using a timing calibration algorithm having rotating line source, in the present embodiments, implementation is easier since a stationary source(s) may be used. In other words, no motorized source-rotation apparatus is required.

As compared to using the timing calibration algorithm having a point source in a scattering block, the present embodiments provide a number of advantages. For instance, in the present embodiments, the same energy window as the clinical application can be used for timing calibration, which is able to improve the accuracy of the timing calibration. Further, the same data may be used for both timing offset calibration and walk correction coefficient calibration. Moreover, one crystal is coupled (with high statistics) to many more crystals than with scattering block, which makes the algorithm converge faster.

At least certain portions of the processing described above, such as the calculation circuitry and the calibration circuitry shown in FIG. 14 and image reconstruction utilized to measure the position of annihilation target by PET imaging in S1003 of FIG. 11 can be implemented or aided by using some form of computer having at least one microprocessor or by using a processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 15:
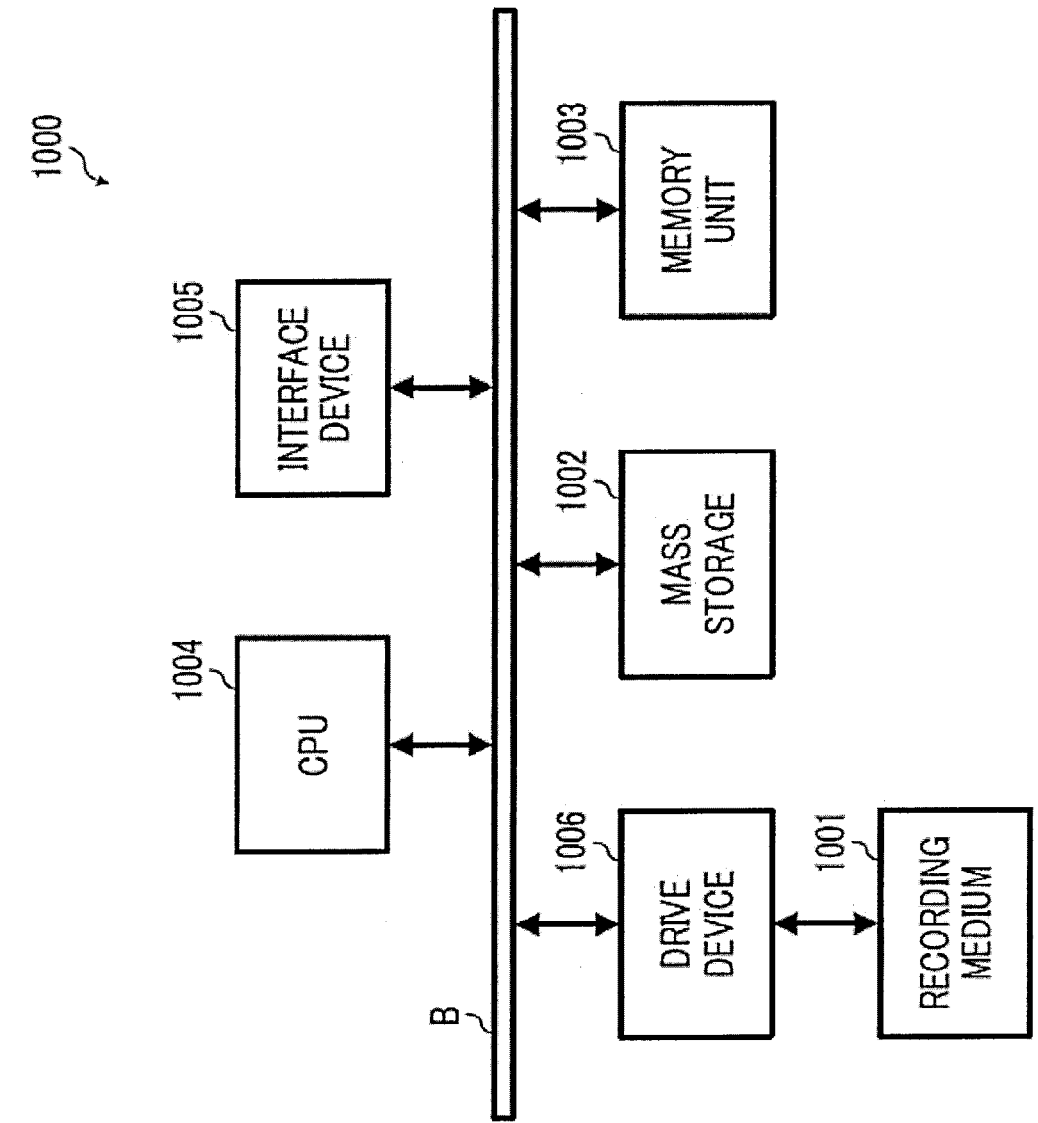
FIG. 15 illustrates a block diagram illustrating a computing device according to one embodiment.

In addition, certain features of the embodiments can be implemented using a computer based system (FIG. 15). The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multiprocessing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method of calibrating an imaging system, comprising:
arranging a positron-emitting radioisotope source in or adjacent to an imaging region of the imaging system;
arranging an annihilation target at a position separated from the positron-emitting radioisotope source by a predetermined distance;
detecting coincident event pairs resulting from annihilation of positrons at the annihilation target;
computing a calibration time offset for a detector element in the imaging system based on the detected coincident event pairs; and
calibrating the detector element with the completed calibration time offset.

2. The method of claim 1, further comprising:
generating at least one pair-timing-difference histogram from the detected coincident event pairs, wherein
the computing step further comprises computing the calibration time offset for the detector element using the at least one pair-timing-difference histogram.

3. The method of claim 2, wherein the calibration time offset corresponds to the centroid of the pair-timing-difference histogram.

4. The method of claim 3, further comprising:
iteratively updating the calibration time offset for each detector element until the absolute value of the centroid of the pair-timing-difference histogram for each detector element is below a preset threshold.

5. The method of claim 2, wherein the step of computing the calibration time offset further includes applying a difference minimization technique.

6. The method of claim 2, further comprising:
dividing the pair-timing-difference histogram for each line-of-response into at least one region, with each region representing an intersection of the line-of-response with the annihilation target.

7. The method of claim 6, further comprising:
applying a different time shift to each region, the time shift being calculated based on distances from intersection points to each detector element representing end points of the line-of-response.

8. The method of claim 6, further comprising:
arranging a field-of-view for forming coincident pairs such that when multiple intersections of any lines-of-response with the annihilation target exist, distances between subsequent intersections are extensive enough to allow for distinct regions to be identified from inspection of the pair-timing-difference histogram.

9. The method of claim 1, wherein the positron-emitting radioisotope source is one of a point source and a line source.

10. The method of claim 1, wherein the positron-emitting radioisotope source is outside of the field of view of the imaging system.

11. The method of claim 1, wherein the annihilation target is an inner bore cover of the imaging system or is a surface of detectors in the imaging system.

12. The method of claim 1, wherein the annihilation target is in the shape of a cylindrical shell.

13. The method of claim 12, further comprising:
arranging the positron-emitting radioisotope source within the cylindrical shell.

14. The method of claim 13, further comprising:
depositing the positron-emitting radioisotope source substantially uniformly over the inner surface of the cylindrical shell.

15. The method of claim 14, further comprising one or more of:
mixing a liquid positron-emitting radioisotope source with gelatin,
mixing an adhesive type material with a liquid positron-emitting radioisotope source, and
making the inner surface of the shell from an absorbent material.

16. The method of claim 12, wherein the diameter of the cylindrical shell is at least 10 cm.

17. The method of claim 13, further comprising:
arranging the positron-emitting radioisotope source substantially at an iso-center of the imaging system;
computing walk correction coefficients using the coincident event pairs originating from annihilations at the positron-emitting radioisotope source or at a source holder; and
calibrating the detector element using the walk correction coefficients.

18. The method of claim 17, further comprising:
parallelizing the calculation of the walk correction coefficients such that events detected in opposite detector pairs are processed independently.

19. The method of claim 1, further comprising:
partially evacuating the region between the positron-emitting radioisotope source and the annihilation target.

20. The method of claim 1, further comprising arranging the annihilation target at least 5 centimeters from the positron-emitting radioisotope source.

21. The method of claim 1, wherein the positron-emitting source is one of Ge-68/Ga-68, Na-22, F-18, FDG, or Rb-82.

22. The method of claim 1, further comprising:
imaging the annihilation target with the imaging system in order to determine a position and orientation of the annihilation target.

23. The method of claim 22, further comprising:
calculating, using the position and orientation determined from the image, an expected pair-timing-difference for each line-of-response.

24. The method of claim 1, further comprising:
computing walk correction coefficients using the detected coincident event pairs; and
calibrating the detector element using the walk correction coefficients.

25. An imaging system, comprising:
a positron-emitting radioisotope source arranged in or adjacent to an imaging region of the imaging system;
an annihilation target arranged at a position separated from the positron-emitting radioisotope source by a predetermined distance;
a detector element configured to detect coincident event pairs resulting from annihilation of positrons at the annihilation target;
calculation circuitry configured to compute a calibration time offset for the detector element based on the detected coincident event pairs; and
calibration circuitry configured to calibrate the detector element with the completed calibration time offset.

26. The imaging system according to claim 25, wherein the calculation circuitry is further configured to generate at least one pair-timing-difference histogram from the detected coincident event pairs and to compute the calibration time offset for the detector element using the at least one pair-timing-difference histogram.

27. The imaging system according to claim 26, wherein the calibration time offset corresponds to the centroid of the pair-timing-difference histogram.

28. The imaging system of claim 27, wherein the calculation circuitry is further configured to iteratively update the calibration time offset for each detector element until the difference between a measured centroid of the pair-timing-difference histogram and an expected pair-timing centroid for each detector element is below a preset threshold or until an absolute value of the centroid of the pair-timing-difference histogram for each detector element is below a preset threshold.

29. The imaging system according to claim 26, wherein the calculation circuitry is further configured to compute the calibration time offset by applying a difference minimization technique.

30. The imaging system of claim 26, wherein the calculation circuitry is further configured to divide the pair-timing-difference histogram for each line-of-response into at least one region, with each region representing one intersection of the line-of-response with the annihilation target.

31. The imaging system of claim 30, wherein the calculation circuitry is further configured to apply a different time shift to each region, the time shift being calculated based on distances from intersection points to each detector element representing end points of the line-of-response.

32. The imaging system of claim 30, wherein the calculation circuitry is further configured to limit a field-of-view for forming coincident pairs such that when multiple intersections of any lines-of-response with the annihilation target exist, distances between subsequent intersections are extensive enough to allow for distinct regions to be identified from inspection of the pair-timing-difference histogram.

33. The imaging system of claim 25, wherein the positron-emitting radioisotope source is one of a point source and a line source.

34. The imaging system of claim 25, wherein the positron-emitting radioisotope source is outside of the field of view of the imaging system.

35. The imaging system of claim 25, wherein the annihilation target is an inner bore cover of the imaging system or is a surface of the detector in the imaging system.

36. The imaging system of claim 25, wherein the annihilation target is in the shape of a cylindrical shell.

37. The imaging system of claim 36, wherein the positron-emitting radioisotope source is positioned within the cylindrical shell.

38. The imaging system of claim 37, wherein the positron-emitting radioisotope source substantially is deposited uniformly over the inner surface of the cylindrical shell.

39. The imaging system of claim 38,
wherein a liquid positron-emitting radioisotope source is mixed with gelatin or an adhesive type material, or
wherein the inner surface of the shell is made from an absorbent material.

40. The method of claim 36, wherein the diameter of the cylindrical shell is at least 10 cm.

41. The imaging system of claim 25, wherein the region between the positron-emitting radioisotope source and the annihilation target is partially evacuated.

42. The imaging system of claim 25, wherein the annihilation target is positioned at least 5 centimeters from the positron-emitting radioisotope source.

43. The imaging system of claim 25, wherein the positron-emitting source is one of Ge-68/Ga-68, Na-22, F-18, FDG, or Rb-82.

44. The imaging system of claim 25, wherein the imaging device is further configured to image the annihilation target with the imaging system in order to determine a position and orientation of the annihilation target.

45. The imaging system of claim 44, wherein the calculation circuitry is further configured to calculate, using the position and orientation determined from the image, an expected pair-timing-difference for each line-of-response.

46. The imaging system of claim 25, wherein the calculation circuitry is further configured to compute walk correction coefficients using the detected coincident event pairs, and the calibration circuitry is further configured to calibrate the detector element using the walk correction coefficients.

47. The imaging system of claim 25, wherein the positron-emitting radioisotope source is arranged substantially at an iso-center of the imaging system,
the calculation circuitry is further configured to compute walk correction coefficients using the coincident event pairs originating from annihilations at the positron-emitting radioisotope source or at a source holder; and
the calibration circuitry is further configured to calibrate the detector element using the walk correction coefficients.

48. The method of claim 47, wherein the calculation circuitry is further configured to parallelize the calculation of the walk correction coefficients such that events detected in opposite detector pairs are processed independently.

* * * * *